US005866264A

United States Patent [19]
Zehner et al.

[11] Patent Number: 5,866,264
[45] Date of Patent: Feb. 2, 1999

[54] RENEWABLE SURFACE FOR EXTRUDED SYNTHETIC WOOD MATERIAL

[75] Inventors: Burch E. Zehner, Gahanna; Jeffrey R. Brandt, Blacklick, both of Ohio

[73] Assignee: Crane Plastics Company Limited Partnership, Columbus, Ohio

[21] Appl. No.: 735,334

[22] Filed: Oct. 22, 1996

[51] Int. Cl.⁶ .................................................. B32B 27/10
[52] U.S. Cl. ........................... 428/481; 428/482; 428/483
[58] Field of Search ..................................... 428/142, 151, 428/481, 482, 483

[56] References Cited

U.S. PATENT DOCUMENTS

| | | | |
|---|---|---|---|
| 2,188,396 | 1/1940 | Semon | 18/55 |
| 2,489,373 | 11/1949 | Gilman | 260/37 |
| 2,519,442 | 8/1950 | Delorme et al. | 260/37 |
| 2,935,763 | 5/1960 | Newman et al. | 18/55 |
| 3,287,480 | 11/1966 | Wechsler et al. | 264/122 |
| 3,562,373 | 2/1971 | Logrippo | 264/118 |
| 3,645,939 | 2/1972 | Gaylord | 260/17.4 GC |
| 3,864,201 | 2/1975 | Susuki et al. | 161/160 |
| 3,867,493 | 2/1975 | Seki | 264/45.9 |
| 3,878,143 | 4/1975 | Baumann et al. | 260/17.4 R |
| 3,879,505 | 4/1975 | Boutillier et al. | 264/48 |
| 3,888,810 | 6/1975 | Shinomura | 260/17.4 BB |
| 3,922,328 | 11/1975 | Johnson | 264/46.1 |
| 3,943,079 | 3/1976 | Hamed | 260/17.4 BB |
| 3,954,555 | 5/1976 | Kole et al. | 162/136 |
| 3,956,541 | 5/1976 | Pringle | 428/2 |
| 4,012,348 | 3/1977 | Chelland et al. | 260/28.5 R |
| 4,016,232 | 4/1977 | Pringle | 264/112 |
| 4,016,233 | 4/1977 | Pringle | 264/122 |
| 4,018,722 | 4/1977 | Baker | 260/2.3 |
| 4,029,831 | 6/1977 | Daunheimer | 427/264 |
| 4,045,603 | 8/1977 | Smith | 428/2 |
| 4,056,591 | 11/1977 | Goettler et al. | 264/108 |
| 4,071,479 | 1/1978 | Broyde et al. | 260/2.3 |
| 4,071,494 | 1/1978 | Gaylord | 260/42.14 |
| 4,097,648 | 6/1978 | Pringle | 428/326 |
| 4,102,106 | 7/1978 | Golder et al. | 52/533 |
| 4,107,110 | 8/1978 | Lachowicz et al. | 260/17.4 CL |
| 4,145,389 | 3/1979 | Smith | 264/40.7 |
| 4,157,415 | 6/1979 | Lindenberg | 428/284 |
| 4,168,251 | 9/1979 | Schinzel et al. | 260/17.4 R |
| 4,178,411 | 12/1979 | Cole et al. | 428/310 |
| 4,181,764 | 1/1980 | Totten | 428/155 |
| 4,187,352 | 2/1980 | Klobbie | 521/79 |
| 4,191,798 | 3/1980 | Schumacher et al. | 428/95 |
| 4,203,876 | 5/1980 | Dereppe et al. | 260/17.4 R |
| 4,228,116 | 10/1980 | Colombo et al. | 264/119 |
| 4,239,679 | 12/1980 | Rolls et al. | 260/42.49 |
| 4,241,133 | 12/1980 | Lund et al. | 428/326 |

(List continued on next page.)

FOREIGN PATENT DOCUMENTS

| | | |
|---|---|---|
| 93306843 | 8/1993 | European Pat. Off. . |
| 93306844 | 8/1993 | European Pat. Off. . |
| 93306845 | 8/1993 | European Pat. Off. . |
| 74 06548 | 2/1974 | France . |
| 76 28288 | 9/1976 | France . |
| 79 10288 | 4/1979 | France . |
| 84 07466 | 5/1984 | France . |
| 2042176 | 4/1971 | Germany . |
| 44033/73 | 9/1973 | Germany . |
| 3801574 | 1/1988 | Germany . |
| 2036 148 | 6/1980 | United Kingdom . |
| 8223635 | 8/1982 | United Kingdom . |
| 86 04589 | 2/1986 | United Kingdom . |
| 87 02959 | 2/1987 | United Kingdom . |
| PCT/SE90/ 00014 | 1/1990 | WIPO . |

OTHER PUBLICATIONS

Bibliography of Sold Phase Extrusion, pp. 185–195.

Dalväg et al., The Efficiency of Cellulosic Fillers in Common Thermoplastics. Part II. Filling with Processing Aids and Coupling Agents, 1985, vol. 11, pp. 9–38.

Fiberloc Polymer Composites, B.F. Goodrich, Geon Vinyl Division, section 1, pp. 2–15.

Henrici–Olive et al., Integral/Structural Ploymer Foams, Technology, Properties and Applications, Springer–Verlag, pp. 111–122.

Klason et al., The Efficiency of Cellulosic Fillers in Common Thermoplastics. Part 1. Filling without Processing Aids or Coupling Agents, Polymeric Materials, 1984, vol. 10, pp. 159–187.

Kokta et al., Composites of Poly(Vinyl Chloride) and Wood Fibers. Part II: Effect of Chemical Treatment, Polymer Composites, Apr. 1990, pp. 84–89.

Kokta et al., Composites of Polyvinyl Chloride–Wood Fibers. I. Effect of Isocyanate as a Bonding Agent, Polym.–Plast. Technol. Eng., 1990, 29(1&2), pp. 87–118.

Kokta et al., Composites of Polyvinyl Chloride–Wood Fibers. III: Effect of Silane as Coupling Agent, Journal of Vinyl Technology, Sep. 1990, pp. 146–153.

Kokta et al., Use of Grafted Wood Fibers in Thermoplastic Composites v. Polystyrene, Centre de recherche en pâtes et papiers, Université du Québec à Trois-Rivières, Canada.

Kokta et al., Use of Wood Fibers in Thermoplastic Composites, Polymer Composites, Oct. 1983, pp. 229–232.

Maldas et al., Composites of Polyvinyl Chloride–Wood Fibers: IV. Effect of the Nature of Fibers, Journal of Vinyl Technology, Jun. 1989, pp. 90–98.

Myers et al., Bibliography: Composites from Plastics and Wood–Based Fillers, USDA Forest Products Laboratory, Madison, WI, pp. 1–27 odds (1991).

Myers et al., Effects of Composition and Polypropylene Melt Flow on Polypropylene–Waste Newspaper Composites, ANTEC, 1984, pp. 602–604.

Myers et al., Wood Fiber/Polymer Composites: Fundamental Concepts, Processes, and Material Options, Wood flour and polypropylene or high–density polyethylene composites: influence of maleated polypropylene concentration and extrusion temperature on properties, pp. 49–56.

(List continued on next page.)

Primary Examiner—Edward J. Cain
Attorney, Agent, or Firm—Standley & Gilcrest

[57] ABSTRACT

A process is described in which an article of manufacture may be produced which includes a renewable surface on a synthetic wood composite substrate.

19 Claims, 2 Drawing Sheets

U.S. PATENT DOCUMENTS

| | | | |
|---|---|---|---|
| 4,244,903 | 1/1981 | Schnause | 264/68 |
| 4,248,743 | 2/1981 | Goettler | 260/17.4 BB |
| 4,250,222 | 2/1981 | Mavel et al. | 428/285 |
| 4,263,184 | 4/1981 | Leo et al. | 260/17.4 CL |
| 4,263,196 | 4/1981 | Schumacher et al. | 260/33.6 |
| 4,272,577 | 6/1981 | Lyng | 428/112 |
| 4,273,688 | 6/1981 | Porzel et al. | 260/17.4 R |
| 4,303,019 | 12/1981 | Haataja et al. | 108/51.1 |
| 4,305,901 | 12/1981 | Prince et al. | 264/176 R |
| 4,317,765 | 3/1982 | Gaylord | 523/204 |
| 4,323,625 | 4/1982 | Coran et al. | 428/361 |
| 4,376,144 | 3/1983 | Goettler | 428/36 |
| 4,382,758 | 5/1983 | Nopper et al. | 425/82.1 |
| 4,414,267 | 11/1983 | Coran et al. | 428/288 |
| 4,420,351 | 12/1983 | Lussi et al. | 156/62.4 |
| 4,430,468 | 2/1984 | Schumacher | 524/109 |
| 4,480,061 | 10/1984 | Coughlin et al. | 524/13 |
| 4,481,701 | 11/1984 | Hewitt | 29/416 |
| 4,491,553 | 1/1985 | Yamada et al. | 264/51 |
| 4,503,115 | 3/1985 | Hemels et al. | 428/281 |
| 4,505,869 | 3/1985 | Nishibori | 264/115 |
| 4,506,037 | 3/1985 | Suzuki et al. | 521/82 |
| 4,508,595 | 4/1985 | Gåsland | 162/158 |
| 4,562,218 | 12/1985 | Fornadel et al. | 524/15 |
| 4,594,372 | 6/1986 | Natov et al. | 523/208 |
| 4,597,928 | 7/1986 | Terentiev et al. | 264/87 |
| 4,610,900 | 9/1986 | Nishibori | 428/15 |
| 4,645,631 | 2/1987 | Hegenstaller et al. | 264/69 |
| 4,659,754 | 4/1987 | Edwards et al. | 523/214 |
| 4,687,793 | 8/1987 | Motegi et al. | 523/200 |
| 4,717,742 | 1/1988 | Beshay | 523/203 |
| 4,737,532 | 4/1988 | Fujita et al. | 524/13 |
| 4,783,493 | 11/1988 | Motegi et al. | 524/13 |
| 4,789,604 | 12/1988 | van der Hoeven | 428/503 |
| 4,791,020 | 12/1988 | Kokta | 428/326 |
| 4,801,495 | 1/1989 | van der Hoeven | 428/286 |
| 4,818,604 | 4/1989 | Tock | 428/319.9 |
| 4,820,749 | 4/1989 | Beshay | 523/203 |
| 4,851,458 | 7/1989 | Hopperdietzel | 523/205 |
| 4,889,673 | 12/1989 | Takimoto | 264/118 |
| 4,892,774 | 1/1990 | Vallance | 428/174 |
| 4,894,192 | 1/1990 | Warych | 264/68 |
| 4,915,764 | 4/1990 | Miani | 156/244.19 |
| 4,927,572 | 5/1990 | van der Hoeven | 264/22 |
| 4,927,579 | 5/1990 | Moore | 264/101 |
| 4,935,182 | 6/1990 | Ehner et al. | 264/112 |
| 4,968,463 | 11/1990 | Levasseur | 264/40.1 |
| 5,008,310 | 4/1991 | Beshay | 524/13 |
| 5,009,586 | 4/1991 | Pallmann | 425/311 |
| 5,064,592 | 11/1991 | Ueda et al. | |
| 5,075,359 | 12/1991 | Castagna et al. | 524/13 |
| 5,078,937 | 1/1992 | Eela | 264/109 |
| 5,082,605 | 1/1992 | Brooks et al. | 264/40.6 |
| 5,087,400 | 2/1992 | Theuveny | 264/115 |
| 5,088,910 | 2/1992 | Goforth et al. | 425/142 |
| 5,096,046 | 3/1992 | Goforth et al. | 198/604 |
| 5,096,406 | 3/1992 | Brooks | 425/205 |
| 5,120,776 | 6/1992 | Raj et al. | 524/13 |
| 5,153,241 | 10/1992 | Beshay | 524/8 |
| 5,164,267 | 11/1992 | D'Heur et al. | 428/474.4 |
| 5,194,461 | 3/1993 | Bergquist et al. | 524/13 |
| 5,272,000 | 12/1993 | Chenoweth et al. | 428/283 |
| 5,276,082 | 1/1994 | Forry et al. | 524/504 |
| 5,288,772 | 2/1994 | Hon | 524/35 |
| 5,302,634 | 4/1994 | Mushovic | 523/219 |
| 5,369,147 | 11/1994 | Mushovic | 523/219 |
| 5,406,768 | 4/1995 | Giuseppe et al. | 52/730.4 |
| 5,474,722 | 12/1995 | Woodhams | 264/45.3 |
| 5,480,602 | 1/1996 | Nagaich | 264/122 |
| 5,486,553 | 1/1996 | Deaner et al. | 524/13 |
| 5,497,594 | 3/1996 | Giuseppe et al. | 52/730.4 |
| 5,516,472 | 5/1996 | Laver | 264/118 |
| 5,518,677 | 5/1996 | Deaner et al. | 264/142 |
| 5,532,065 | 7/1996 | Gübitz | 428/480 |
| 5,539,027 | 7/1996 | Deaner et al. | 524/13 |
| 5,576,374 | 11/1996 | Betso et al. | 524/451 |
| 5,585,155 | 12/1996 | Heikkila et al. | 428/36.7 |
| 5,593,625 | 1/1997 | Riebel et al. | 264/115 |
| 5,654,091 | 8/1997 | Kiriazis et al. | 428/332 |

OTHER PUBLICATIONS

Pornnimit et al., Extrusion of Self–Reinforced Polyethylene, Advances in Polymer Technology, vol. 11, No. 2, pp. 92–98.

Raj et al., Use of Wood Fiber as Filler in Common Thermoplastics: Studies on Mechanical Properties, Science and Engineering of Composite Materials, vol. 1 No. 3, 1989, pp. 85–98.

Raj et al., Use of Wood Fibers in Thermoplastics. VII. The Effect of Coupling Agents in Polyethylene–Wood Fiber Composites, Journal of Applied Polymer Science, vol. 37, pp. 1089–1103 (1989).

Sonwood outline, Apr. 1975.

Sonwood: a new PVC wood–flour alloy for Extrusions and other Plastic Processing Techniques, Sonesson Plast AB, Malmo, Sweden.

Thomas et al., Wood Fibers as Reinforcing Fillers for Polyolefins, ANTEC, 1984, pp. 687–689.

Woodhams et al., Wood Fibers as Reinforcing Fillers for Polyolefins, Polymer Engineering and Science, Oct. 1984, pp. 1166–1171.

Yam et al., Composites from Compounding Wood Fibers With Recycled High Density Polyethylene, Polymer Engineering and Science, mid–Jun. 1990, pp. 693–699.

Zadorecki et al., Future Prospects for Wood Cellulose as Reinforcement In Organic Polymer Composites, Polymer Composites, Apr. 1989, pp. 69–77.

Bendtsen et al., Mechanical Properties of Wood, pp. 4–2 to 4–44.

Brzoskowski et al., Air–Lubricated Die for Extrusion of Rubber Compounds, Rubber Chemistry and Technology, vol. 60, pp. 945–956.

Collier et al., High Strength Extrudates by Melt Transformation Coextrusion, ANTEC, 1987, pp. 497–502.

Techno Material, Techno Material Co., Ltd.

Collier et al., Streamlined Dies and Profile Extrusion, ANTEC, 1987, pp. 203–206.

Company News, Plastics Industry News, May 1994, pp. 70–71.

Fill Thermoplastics with Wood, Modern Plastics, May 1974, pp. 54–55.

Fillers for Thermoplastics: Beyond Resin Stretching, Modern Plastics International, Oct. 1976, pp. 12–15.

From Sweden: Extruded Interior Trim Made of PVC and Wood Flour, Plastic Building Construction, vol. 9 No. 5, 1986, pp. 5–6.

Maldas, et al.. Improving Adhesion of Wood Fiber with Polystrene by the Chemical Treatment of Fiber with a Coupling Agent and the Influence on the Mechanical Properties of Composites, Journal of Adhesion Science Technology, vol. 3 No. 7, pp. 529–539 (1989).

Resin Stretching: Accent on Performance, Modern Plastic International, Jan. 1974, pp. 58–60.

Wood Filled PVC, Plastics Industry News, Jul. 1996, p. 6.

Yuskova, et al., Interaction of Components in Poly(Vinyl Choloride) Filled in Polymetization Stage, Makromol. Chem., Macromol, Symp., No. 29, pp. 314–320 (1989).

RENEWABLE SURFACE FOR EXTRUDED SYNTHETIC WOOD MATERIAL

BACKGROUND AND SUMMARY OF THE INVENTION

The present invention relates generally to wood replacement materials. In particular, the present invention relates to a wood-polymer composite material suitable for use in place of natural wood. The present invention describes a process for manufacturing the composite materials.

For several reasons, there is a need to find materials that exhibit the look and feel of natural wood. One reason has to do with the supply of good wood for construction purposes from the world's forests. This supply of wood from mature trees has become an important issue in recent years and as a result the cost of wood has risen.

Several attempts have been made by others to find a wood like material. Many of these efforts have failed due to the qualities of the resultant product.

In addition to natural wood, other materials such as particle board, wafer board, and the like may be replaced by the synthetic wood of the present invention. One noticeable improvement over these materials is that synthetic wood has enhanced moisture resistance.

The present invention overcomes many of the disadvantages of the prior art attempts at a quality wood replacement material that is capable of being produced in a commercially practicable production environment. The present invention includes the combining of cellulosic material with a thermoplastic material and optionally with a cross-linking agent to form a combined product.

In the present invention conventional extrusion equipment is used to fuse the combined product under sufficient conditions to blend the combined product into a homogeneous mixture. The mixture of material is extruded through at least one die in a manner described in greater detail hereinafter.

The extruder preferably comprises a hopper to receive and mix the organic fibrous material and the thermoplastic material before being extruded through the die system. In a preferred material composition of the present invention, the synthetic wood material includes approximately two-thirds organic fibrous or cellulosic material and approximately one-third thermoplastic material in combination. The resultant product has an appearance similar to wood and may be sawed, sanded, shaped, turned, fastened and/or finished in the same manner as natural wood. The resultant product is resistant to rot and decay as well as termite attack. The resultant product may be used for example as, decorative moldings inside or outside of a house, picture frames, furniture, porch decks, window moldings, window components, door components, roofing systems, and any other type of use where structural requirements do not exceed the physical properties of the resultant material.

The present invention is useful in a number of different extrusion environments. More particularly, in a preferred embodiment of the present invention, it is useful in conjunction with the synthetic wood composition and method as described in U.S. Pat. No. 5,516,472 which issued May 14, 1996 entitled EXTRUDED SYNTHETIC WOOD COMPOSITION AND METHOD FOR MAKING SAME.

DETAILED DESCRIPTION OF PREFERRED EMBODIMENT(S)

The present invention is directed toward synthetic wood extrusions of the type in which synthetic wood material composites are extruded through at least one die. The die may produce strands of the composite material that flow into a packer or in another embodiment of the invention, the die may simply produce one flowable homogeneous mass of material into the packer.

As the strands, in the preferred embodiment, leave the stranding die and enter the packer the material is compressed causing the material to bond to adjacent material strands. In a packer, the final shape is maintained while the cross linking agents continue to react which bond the material together along with the individual cellulose molecular chains. The formed product is then cooled in a cooling tank and transported to an area where it may be cut into desired lengths.

The cellulosic fibrous-polymer composite material used in the present invention may have a higher cellulosic fiber content then normally recognized. The overall process may include the mixing of raw materials including cellulosic fibers, thermoplastic materials, cross-linking agents and process lubricants. The cellulosic material may be any one or more cellulosic materials such as sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo or palm fiber, and kenaf. Cellulosic material is first dried to a low moisture content. A preferred moisture content is about 1%–10%.

Thermoplastic materials may include multilayer films, polyethylene, polypropylene, polyvinyl chloride (PVC), low density polyethylene (LDPE), ethyl-vinyl acetate, other polyethylene copolymers and other thermoplastics.

Examples of cross-linking agents include polyurethanes, such as isocynate, phenolic resins, unsaturated polyesters and epoxy resins and combinations of the same. Lubricants may be added as a process aid. Examples of lubricants include zinc stearate or wax. Other materials may be added which are known to the art of extrusion and include accelerators, inhibitors, enhancers, compatibilizers and blowing agents.

Two example formulation recipes are described below:

|  | Amount (parts) |
|---|---|
| Recipe A |  |
| Wood Flour (40/mesh maple) | 250 |
| Polyethylene (HDPE) | 100 |
| Zinc Stearate | 7.5 |
| External Wax | 5 |
| Phenolic Resin | 15 |
| Isocyanate (MDI) | 2.5 |

-continued

| | Amount (parts) |
|---|---|
| Recipe B | |
| Wood Flour (40/mesh maple) | 250 |
| PVC | 100 |
| Lubricant (ester) | 3 |
| External Wax | 4 |
| Process Aids (acrylic) | 4 |
| Calcium Stearate | 2 |
| Tin Stabilzer | 2 |

Figure 1:
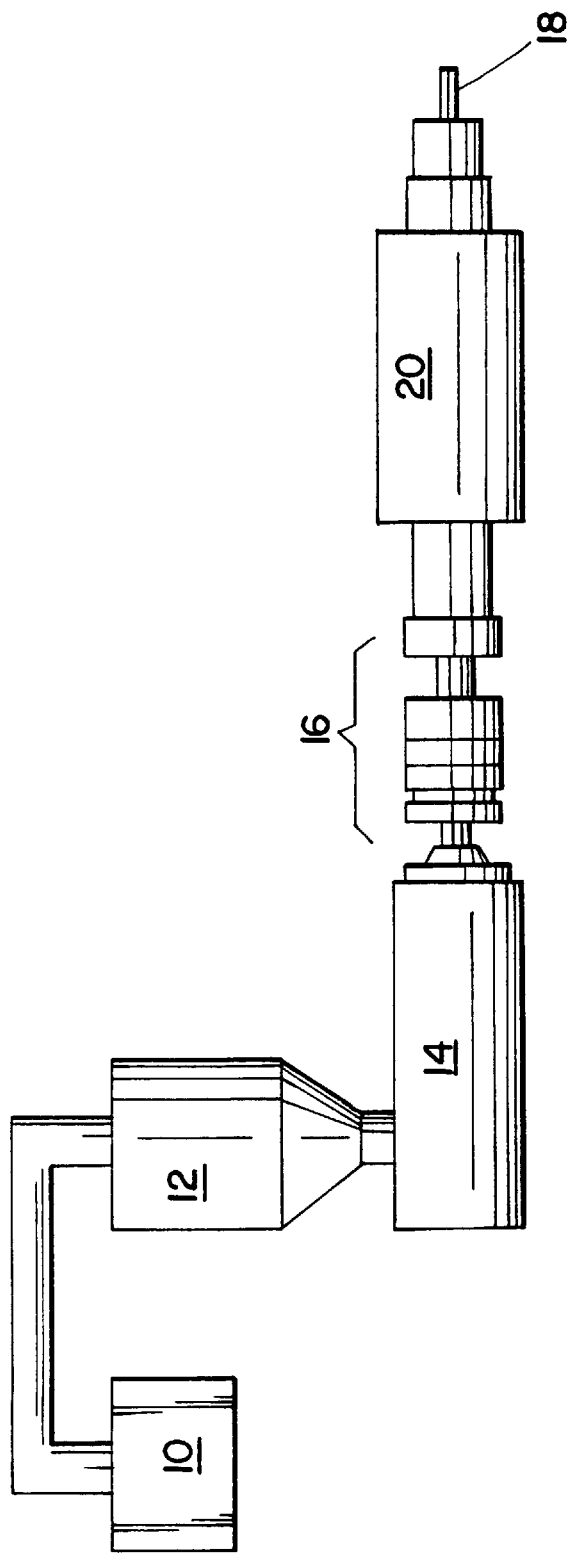
FIG. 1 is a schematic diagram illustrating the process of the present invention.

In the preferred embodiment of the present invention the cellulosic fiber, thermoplastic raw materials, and other minor ingredients are physically mixed or blended by any conventional mixing device or industrial blender 10. The composition is then placed into a typical feed hopper 12 as shown in FIG. 1. Feed hoppers such as gravity feed or force feed mechanisms (having a crammer) may be used. Once the materials are properly mixed and transferred to the hopper they are delivered to a heated extruder 14. The preferred process temperature at the extruder is about 325° F. Several well known extruders may be used in the present invention. A twin screw extruder by Cincinnati Milacron (CM80-HP) may be used. In the extruder, the materials are blended and heated and then forced into a die system. The flow rate of the extruder may be between about 150 and 600 pounds per hour. The die system 16 is made up of one or more plates. The die system allows the starting materials to bond and form a shaped-homogeneous product. A typical plate may be made from cast iron and stainless steel material.

In one embodiment the die system is comprised of a plurality of plates nested together to form one continuous die. The first die connected to the extruder is known as an adapter die. Following the adapter die is a transition die. The transition die transforms the combined material discharged from the round stock exiting the adapter die to a shape more generally approaching that of the finished product. Following the transition die is a stranding die. The stranding die plate has multiple apertures which may be substantially round. In a preferred embodiment the stranding die contains apertures which are approximately one-eighth of an inch in diameter. As the material leaves the stranding die it leaves in strands of homogeneous material which are compressed together in a molding die. The molding die is contemplated to take a shape of many common items such as decorative house hold moldings including crown moldings, chair rails, baseboards, door moldings, picture frames, furniture trim, and other products. After passing through the molding die the material enters the setting die where the final shape is maintained. This setting die is also known as the packer. The final shape is maintained yet substantially compressed in overall cross section area. The extruded material 18 is cooled in a cooling chamber 20 and later cut to a required size.

The present invention concerns the addition of a renewable surface onto a synthetic wood material of the type described above. A renewable surface that may be used in the present invention is ENDURAN™ or mineral filled PBT. ENDURAN™ is a high density, mineral-filled polymer which is available from GE Plastics. A renewable surface allows sanding minor surface damage to restore the original appearance. Standard counter laminates cannot be refurbished in this manner. This renewable surface may be coextruded onto a composite synthetic wood material, which has superior moisture resistance compared to particle board.

Figure 2:
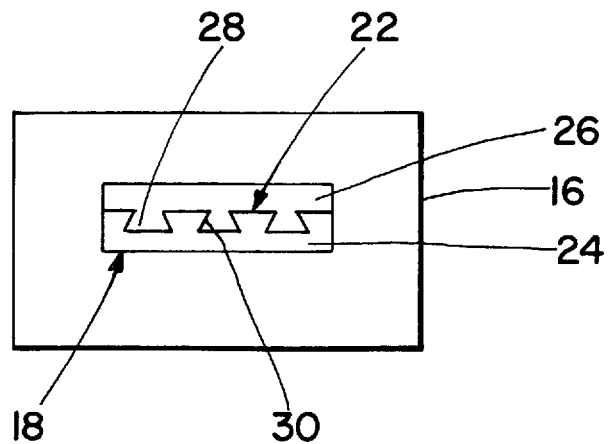
FIG. 2 is a cross-sectional view of a die system of a preferred embodiment of the present invention.

In one embodiment of the present invention the coextrusion incorporates a mechanical lock feature 22 which bonds the two materials 24, 26 of the extruded material 18 together. The mechanical lock is best shown in FIG. 2. In this case an Enduran™ material 26 has been coextruded onto a cellulosic/polyethylene composite material 24. The composite material is formed with angled pockets 28 to receive the coextruded Enduran™ material thereon. Since the coextrusion process is done under heat the Enduran™ material flows into the pockets and later as the coextrusion cools the Enduran™ material is locked in place within the pockets of the composite material. The pockets preferably include at least one acute angle 30 inside a pocket to enhance the interlock of the two materials.

Figure 3:
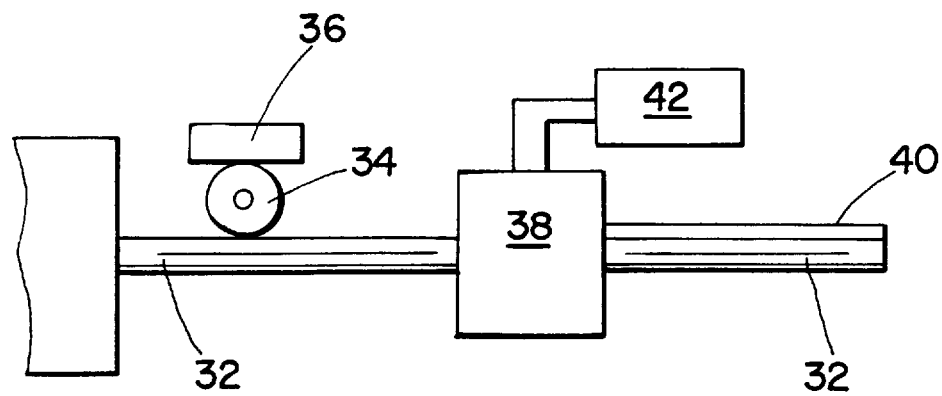
FIG. 3 is a schematic representation of another embodiment of the present invention.

A second method for accomplishing the combination of the renewable surface and the composite material is to first extrude the composite material 32 and pass it through a roller 34 for an adhesive 36 to be placed on the composite material, as shown in FIG. 3. After the adhesive is placed on the material the composite material 32 is passed through a cross head die 38 and a layer 40 of the renewable surface material 42 is added in a conventional hot melt process.

Figure 4:
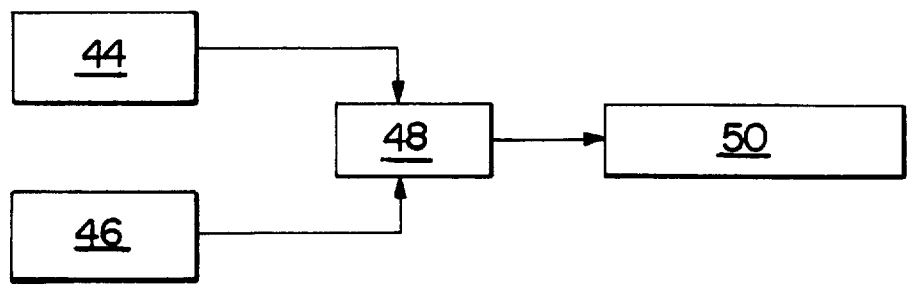
FIG. 4 is a flow chart of yet another embodiment of the present invention.

A third method for applying the renewable surface to the composite material is to form two separate extrusion lines. The first line would be for the extrusion 44 of the composite material while the second line would have extrusions 46 of the renewable surface. At a later point in the process the two materials would be formed together with an adhesive step 48 as shown in FIG. 4. The resultant material 50 provides a unique combination of materials not heretofore seen in the art.

The above described advantages and features of the present invention are offered as an example of the way in which the present invention may be commercially implemented. The embodiments listed herein are, therefore, exemplary in nature and are not intended to unnecessarily limit the scope of the following claims.

What is claimed is:

1. An article of manufacture, comprising:
 a composite material comprising cellulosic material of 50–70% by weight, and a thermoplastic of 20% to 40% by weight, coextruded with a non-metallic, renewable surface material.

2. The article of manufacture claim 1, wherein the renewable surface material flows into pockets formed into the composite material during the coextrusion process.

3. The article of manufacture of claim 1, wherein the renewable surface material is a high density, mineral-filled polymer.

4. The article of manufacture of claim 1, wherein the cellulosic material is wood flour.

5. The article of manufacture of claim 1, wherein said thermoplastic is polyethylene.

6. The article of manufacture of claim 1, wherein said thermoplastic is PVC.

7. A process for forming a renewable surface on a composite synthetic wood material, the process comprising the steps of:
 coextruding a synthetic wood material composition including from 50–70% by weight cellulosic material and from 20% to 40% thermoplastic material with a filled PBT and thermoplastic with an interlocking mechanical bond designed in the synthetic wood and filled with the melt of the PBT.

8. A process for forming a renewable surface on a composite synthetic wood material, the process comprising the steps of:
 extruding a synthetic wood material composition including from 50–70% by weight cellulosic material and from 20% to 40% thermoplastic material;

passing the extruded composite synthetic wood material through a roller to apply adhesive to a surface of the composite synthetic wood material;

passing the extruded composite synthetic wood material having an adhesive on a surface thereof through a cross head die; and applying a hot melt of a non-metallic, renewable surface material onto said composite synthetic wood material in said cross head die.

9. A process for forming a renewable surface onto a composite synthetic wood material, said process comprising the steps of:

extruding a composite synthetic wood material including 50–70% by weight cellulosic material and 20% to 40% by weight thermoplastic material;

extruding a non-metallic, renewable surface material; and bonding the extruded composite synthetic wood material to the extruded renewable surface material with an adhesive.

10. The article of manufacture of claim 1, wherein said non-metallic, renewable surface material is mineral-filled PBT.

11. The article of manufacture of claim 1, wherein said composite material and said non-metallic, renewable surface material are interlocked.

12. The process of claim 8, wherein said non-metallic, renewable surface material is a high density, mineral-filled polymer.

13. The process of claim 8, wherein said non-metallic, renewable surface material is mineral-filled PBT.

14. The process of claim 8, wherein said thermoplastic material includes polyethylene.

15. The process of claim 8, wherein said thermoplastic material includes PVC.

16. The process of claim 9, wherein said non-metallic, renewable surface material is a high density, mineral-filled polymer.

17. The process of claim 9, wherein said non-metallic, renewable surface material is mineral-filled PBT.

18. The process of claim 9, wherein said thermoplastic material includes polyethylene.

19. The process of claim 9, wherein said thermoplastic material includes PVC.

* * * * *